May 23, 1967 H. R. HAISE ETAL 3,320,750

REMOTE CONTROL IRRIGATION SYSTEM

Filed Dec. 8, 1964 2 Sheets-Sheet 1

H. R. HAISE &
E. G. KRUSE
INVENTORS

BY R. Hoffman
ATTORNEY

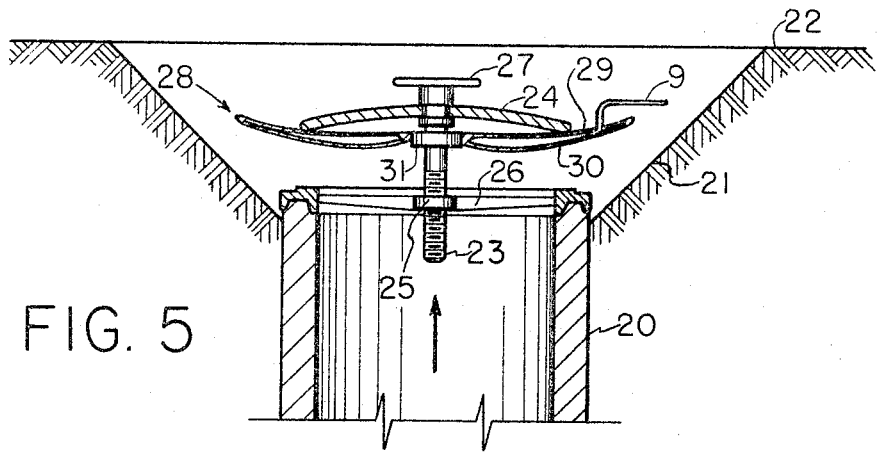
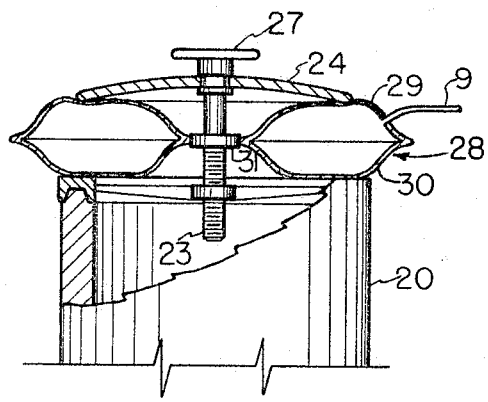
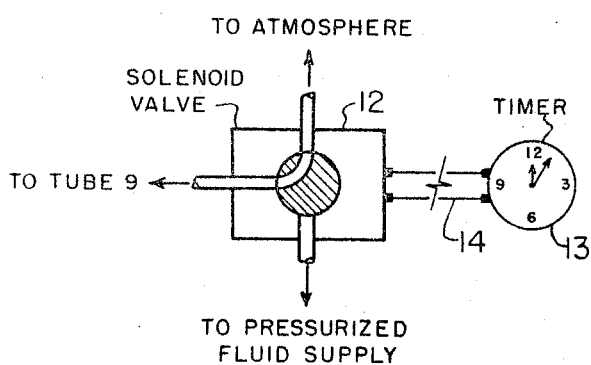
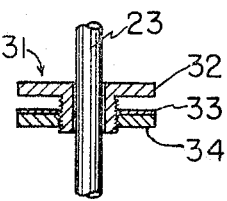

United States Patent Office 3,320,750
Patented May 23, 1967

3,320,750
REMOTE CONTROL IRRIGATION SYSTEM
Howard R. Haise and Ernest G. Kruse, Fort Collins, Colo., assignors to the United States of America as represented by the Secretary of Agriculture
Filed Dec. 8, 1964, Ser. No. 416,939
2 Claims. (Cl. 61—12)

A non-exclusive irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel irrigation equipment whereby the flow of water can be controlled from remote locations. Further objects of the invention will be evident from the following description.

Figure 1:
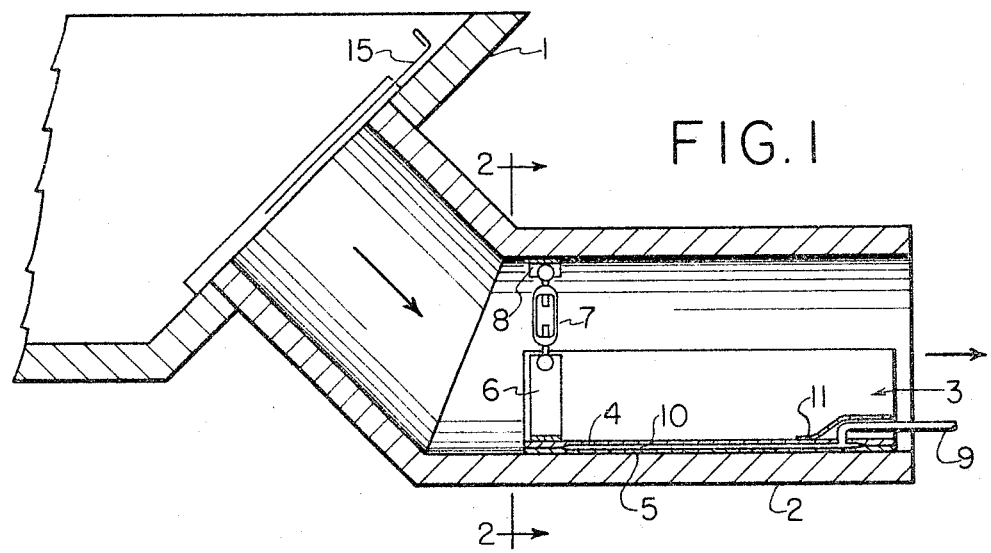
Figure 3:
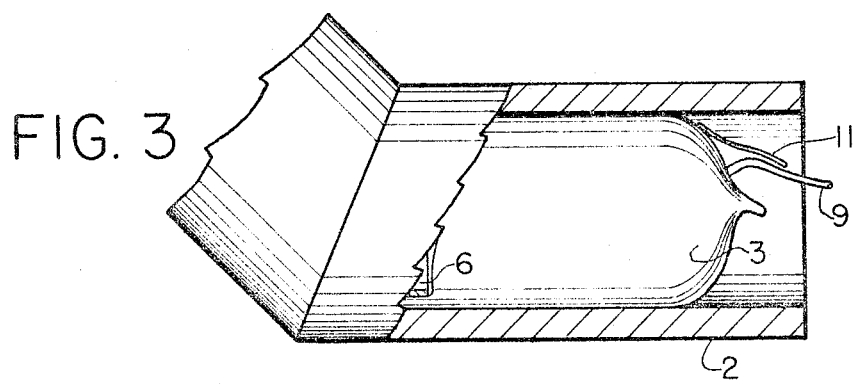
Figure 2:
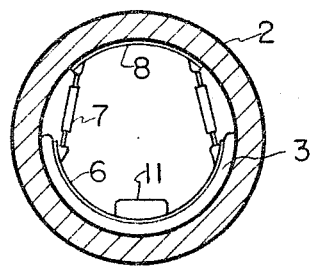

In the annexed drawing: FIGURE 1 is an elevation, partly in cross-section, of one form of a system embodying the principles of the invention. FIGURE 2 is a section on plane 2—2 of FIG. 1. FIGURE 3 illustrates the system of FIG. 1 in a condition where the flow of water is cut off. FIGURE 4 is a schematic diagram illustrating equipment for automatic remote control. FIGURE 5 is an elevation, partly in cross-section, illustrating another embodiment of the invention. FIGURE 6 illustrates the system of FIG. 5 in a condition wherein the flow of water is cut off. FIGURE 7 is a detail view of a portion of the apparatus shown in FIGS. 5 and 6.

In conventional irrigation systems, the flow of water to furrows, fields, or other selected areas is controlled by individual manually-operated valves such as slide valves. Operating such systems involves considerable labor in traveling to the various points where the valves are located and in making the appropriate adjustment of the manual valves. The system of the invention has the advantage that all this labor is obviated. In accordance with the invention, the flow at the various points in the irrigation system for an entire farm, ranch, or the like, can be controlled from a central control point. At this central point the individual valves may be opened or closed by manual adjustment of electrical circuits or the individual valves may be opened or closed automatically, as by the use of timers. The invention not only provides the significant advantage of centralized control but also does so with the use of simple and inexpensive equipment. Thus a special feature of the invention is the provision of individual valves at the appropriate points in the system, these valves having an inflatable structure and being operated by fluid pressure. These valves are not only adapted for control from a central point but also are relatively inexpensive and simple in construction. They are especially adapted for use with the generally rough type of construction in irrigation systems because they do not involve any close tolerances and are completely devoid of gears, levers, sprockets, or other mechanical arrangements which would require accurate alignment and regular lubrication and other maintenance in an environment constantly exposed to water, dirt, fertilizers, insecticides, etc.

Referring to the drawing, particularly FIGS. 1, 2, and 3, the illustrated system includes a ditch 1 and a pipe 2, the latter representing, by way of example, a turnout which supplies water by gravity from the ditch to an individual furrow, a lateral ditch, or other branch of the system.

Within pipe 2 is disposed an inflatable bag made of rubber or other elastomer, generally designated as 3. Bag 3 is fabricated from sheets 4 and 5 cemented or otherwise adhered at their edges to form an air-tight, flat container, somewhat resembling a conventional hot-water bottle. (In the drawing, sheets 4 and 5 are shown with exaggerated thickness and separation for clarity of representation.)

To minimize obstruction of the flow of water, bag 3 is laid flat about the lower periphery of the inner wall of pipe 2 and is held in place by an arcuate clamp 6, the latter cooperating with turnbuckle 7 and upper arcuate member 8, whereby clamp 6 presses bag 3 tightly against the inner wall of pipe 2 and holds it securely in place.

Special attention is called to the facts (1) that the inflatable bag is maintained flat against the inner wall of the pipe and (2) that the inflatable bag is clamped at its upstream end. Both of these factors contribute to minimizing impedance to flow of water (and accompanying trash) through the pipe.

Adjacent to its downstream end, bag 3 is provided with a tube 9 which provides communication with the cavity 10 between sheets 4 and 5. A flap 11, of rubber of other elastomer, is provided to prevent trash from lodging at the juncture between tube 9 and bag 3.

To regulate the flow of water through pipe 2, tube 9 is connected to a source of fluid (air or water, for example) whose pressure can be varied. By applying fluid under pressure to tube 9, bag 3 is caused to inflate whereby it effectively plugs up pipe 2 and cuts off the flow of water. The system in this phase of operation is depicted in FIG. 3. When it is desired to resume flow, the pressure applied to tube 9 is released, for example, by having it communicate with the open air, whereupon bag 3 will deflate (to the position shown in FIG. 1), permitting flow of water through pipe 2 in the direction indicated by the arrows. A significant item in this regard is that by placing the tube 9 at the downstream end of bag 3, deflation is enhanced by the pressure of water within pipe 2. Thus, since the water pressure is higher at the left end of pipe 2, as water begins to flow its pressure tends to scavenge all the air out of bag 3 so that it is pressed flat and does not impede the flow.

Reference is now made of FIG. 4 which illustrates an arrangement for remote control. Block 12 represents a conventional solenoid valve which may be actuated to connect tube 9 to a source of fluid under pressure or to the atmosphere. Ordinarily, solenoid valve 12 would be located in the near vicinity of the inflatable valve 3 to be controlled. In the complete irrigation system there would be provided one solenoid valve 12 for each inflatable valve 3 (unless, of course, simultaneous opening and closing of any selected number of inflatable valves would be desired, in which case a single solenoid would be used for the group). At the central point there is provided a conventional timer 13 which transmits via wires 14, appropriate predetermined electrical signals to solenoid 12, i.e., either (1) a signal which actuates solenoid 12 to the position shown in FIG. 4 wherein tube 9 is connected to the atmosphere and hence valve 3 is deflated and water flows through pipe 2 or (2) a signal which actuates solenoid 12 to the position wherein tube 9 is connected to the source of fluid pressure, in which event valve 3 is inflated and the flow of water is cut off. In the complete system, a number of separate timers 13 may be provided to actuate the several olenoids 12, or one may provide a single timer with multiple channels for operation of the individual solenoids. In any case, it will be obvious that by suitable adjustment of the timer controls the various inflatable valves 3 in the irrigation system are automatically operated according to a predetermined pattern.

It is obvious that if operation by timer 13 is not desired, this timer may be disconnected and the various solenoids 12 in the system may be operated by other conventional electrical systems such as manually operated switches, by relay systems activated by recordings on tape, wire, or discs, etc.

The connection between timer 13 and solenoid 12 is generally by low-voltage wires 14. In the alternative, long wires may be eliminated by applying the signals from timer 13 to a radio transmitter and providing valve 2 with a radio receiver to pick up the radiated signals and actuate the solenoid 12 and valve 3 in consonance herewith.

The system of the invention may be used in conjunction with existing manual controls such as slide gate 15 (FIG. 1) or the like which may, for example, be pre-set in certain positions so that when inflatable valve 3 is in the open position, the system will deliver water at a rate determined by the position of the said existing manual control.

In the embodiment of the invention shown in FIGS. 1, 2, and 3, tube 9 extends longitudinally out of the end of pipe 2. If desired, however, the system may be modified so that tube 9 extends from lower sheet 5 through a small hole bored in the bottom of the pipe 2.

Generally, bag 3 and clamp 6 are separate elements which are used cooperatively. However, clamp 6 may be permanently affixed to bag 3 by cementing or other adhering or fastening techniques. Such a system is preferred for providing especially good anchorage of the bag in use.

Reference is now made to FIGS. 5, 6, and 7 which illustrate another embodiment of the invention especially adapted for irrigating fields from an underground supply system. In this system, pipe 20 is connected at its base to the underground source of water. The upper end of pipe 20 connects with pit 21, extending upward to soil surface 22. In operation, water from the underground source flows through pipe 20, pit 21, and over soil surface 22 until the proper depth of water is applied, then the flow is cut off. Arranged on top of pipe 20 is a manually-controlled device, usually referred to as an alfalfa valve, commonly employed in connection with this method of irrigation. The alfalfa valve comprises essentially a threaded stem 23 carrying a circular dished lid 24. Stem 23 is threaded into a threaded nut 25 supported by spider 26. To operate the manual valve, handle 27 on stem 23 is rotated, whereby lid 24 may be forced against the top of pipe 20 (to shut off the water) or raised above the end of pipe 20 to allow water to flow.

In accordance with the invention, the above-described alfalfa valve is used in conjunction with an inflatable member, made of rubber or other elastomeric material, generally designated as 28. In the illustrated version, this member is formed of annular sheets 29 and 30 cemented together at their inner and outer peripheries to form an air-tight flat receptacle. (In the drawing, sheets 29 and 30 are shown with exaggerated thickness and separation for clarity of representation.) To minimize possibility of puncturing, the inflatable member 28 may be formed of an outer casing of nylon-reinforced rubber and an inner chamber of pure rubber or other elastomer, these being arranged to provide the same form as the illustrated version, that is, an essentially flat disc.

To position inflatable member 28, there is provided a collar 31 which is free to slide on stem 23. The inner periphery of member 28 is secured to collar 31, as evident from the details in FIG. 7. Thus, collar 31 includes a flanged, threaded coupling 32, washer 33, and threaded nut 34. The inflatable member 28 is inserted on the threaded stem of coupling 32 with its inner periphery snug against the flange of the coupling, washer 33 is put in place, and nut 34 is then threaded on and tightened to hold the inflatable member 28 tightly within the assembled collar.

Inflatable member 28 is provided with a tube 9 which functions as with the previously-described embodiment to supply a fluid at controlled pressure to inflate the member or deflate it, as desired. Tube 9 is preferably located near the outer periphery of member 28 so that when the pressure within member 28 is released, the flow of water will tend to scavenge all the fluid out of member 28 whereby it will assume an essentially flat cross-section, hence cause minimum impedance to flow of water.

In FIG. 5, the system is shown in the phase of operation wherein tube 9 is connected to the open air so that member 28 is deflated. The force of the water moving upwardly raises the member 28 up to the edge of lid 24 and deflects the outer edges of member 28 upwardly.

Referring now to FIG. 6, when fluid under pressure is introduced via tube 9 into member 28, the latter is inflated to a toroidal shape and cuts off the flow of water by damming up the opening between lid 24 and the top of pipe 20.

It is evident from FIGS. 5 and 6 that installation of the inflatable valve of the invention is very simple, requiring merely the unscrewing of the existing lid 24, positioning inflatable member 28 on stem 23 and replacing the assembly. Moreover, by adjusting the height of lid 24 above pipe 20 one retains a means for controlling the rate of flow when inflatable member 28 is in the deflated position. Thus, the rate-controlling effect of the conventional alfalfa valve is not lost by adding the co-acting valve 28 of the invention.

It is to be noted that collar 31 is free to slide on stem 23. This has the advantage that presence of member 28 does not interfere with variation in the height of lid 24, as may be desired for control of rate of flow. Moreover, this sliding feature is of advantage when the member 28 is in deflated position as it makes it possible for the water to push member 28 out of its path against the edge of lid 24 so that there is minimum obstruction of passage of water.

It is, of course, obvious that the embodiment of FIGS. 5 and 6 can be utilized with a central control system, for example, with a timer, as previously described in connection with the embodiment of FIGS. 1, 2, and 3.

Having thus described the invention, what is claimed is:

1. An irrigation system comprising, in combination, a pipe having an open end and providing the means for conducting water, a lid positioned outwardly from the open end of said pipe, support means secured to the pipe and supporting the lid for adjusting the clearance between said lid and said open pipe end, a normally-flat hollow inflatable member of annular configuration positioned by the said support means intermediate of said open end and said lid in outwardly spaced relation to said open end to permit water to flow therepast, said inflatable member when inflated being of a size to overlap and engage the entire periphery of said open end and to be engaged by the peripheral portion of the lid, a tube communicating with the interior of said member, and means for connecting said tube with a source of fluid under predetermined pressure to inflate said member into contact with the open end and said lid and thereby stop the water flow.

2. An irrigation system comprising, in combination, a pipe having an open end and providing the means for conducting water, a threaded support fixed within said open pipe end, a threaded stem cooperative with said threaded support, a lid carried by said stem and cooperative with said open pipe end to govern the flow of water therethrough, a collar slidably mounted on said stem, a hollow normally-flat inflatable member fixed to said collar and extending between said lid and said open pipe end, a tube communicating with the interior of said member, and means for connecting said tube with a source of fluid under predetermined pressure.

References Cited by the Examiner

UNITED STATES PATENTS

| | | | |
|---|---|---|---|
| 1,018,251 | 2/1912 | McKee | 61—12 |
| 2,240,049 | 4/1941 | Murphy | 61—28 |
| 2,781,051 | 2/1957 | Hawley | 251—61 X |
| 2,874,925 | 2/1959 | Stafford | 251—61 |
| 3,010,692 | 11/1961 | Jentoft | 251—61 |
| 3,173,269 | 3/1965 | Imbertson | 61—27 |

FOREIGN PATENTS

| | | |
|---|---|---|
| 161,034 | 2/1955 | Australia. |
| 887,137 | 1/1962 | Great Britain. |

EARL J. WITMER, *Primary Examiner*.

CHARLES E. O'CONNELL, *Examiner*.